US007543941B2

(12) United States Patent
Holder et al.

(10) Patent No.: US 7,543,941 B2
(45) **Date of Patent: *Jun. 9, 2009**

(54) LIGHT ZOOM SOURCE USING LIGHT EMITTING DIODES AND AN IMPROVED METHOD OF COLLECTING THE ENERGY RADIATING FROM THEM

(75) Inventors: Ronald G. Holder, Laguna Niguel, CA (US); Greg Rhoads, Irvine, CA (US)

(73) Assignee: Cooper Technologies Company, Houston, TX (US)

( * ) Notice: Subject to any disclaimer, the term of this patent is extended or adjusted under 35 U.S.C. 154(b) by 536 days.

This patent is subject to a terminal disclaimer.

(21) Appl. No.: 11/303,418

(22) Filed: Dec. 16, 2005

(65) Prior Publication Data

US 2006/0158887 A1 Jul. 20, 2006

Related U.S. Application Data

(60) Provisional application No. 60/638,956, filed on Dec. 23, 2004.

(51) Int. Cl.

| | |
|---|---|
| ***G03B 29/00*** | (2006.01) |
| ***G03B 21/28*** | (2006.01) |
| ***F21V 7/00*** | (2006.01) |

(52) U.S. Cl. .......................... 353/43; 353/98; 362/516; 362/296; 362/341

(58) Field of Classification Search .................. 353/43, 353/98; 362/516, 296, 341, 800
See application file for complete search history.

(56) References Cited

U.S. PATENT DOCUMENTS

| | | | | |
|---|---|---|---|---|
| 6,986,593 B2 * | 1/2006 | Rhoads et al. | .............. | 362/308 |
| 7,114,832 B2 * | 10/2006 | Holder et al. | .............. | 362/308 |
| 2005/0073849 A1 * | 4/2005 | Rhoads et al. | .............. | 362/296 |

FOREIGN PATENT DOCUMENTS

| | | |
|---|---|---|
| JP | 04174422 A * | 6/1992 |

* cited by examiner

*Primary Examiner*—Diane I Lee
*Assistant Examiner*—Magda Cruz
(74) *Attorney, Agent, or Firm*—King & Spalding LLP

(57) ABSTRACT

An apparatus is comprised of a light source radiating into a peripheral forward solid angle and a center forward solid angle. A reflector is positioned to reflect light from the light source from the peripheral forward solid angle into a longitudinal beam about an optical axis of the reflector. A lens is disposed longitudinally forward of the light source for focusing light into a predetermined beam pattern from the center forward solid angle into a skewed beam in a skewed direction with respect to the optical axis of the reflector to project a composite beam of light comprised of the light radiated in the skewed beam and the longitudinal beam.

20 Claims, 5 Drawing Sheets

LIGHT ZOOM SOURCE USING LIGHT EMITTING DIODES AND AN IMPROVED METHOD OF COLLECTING THE ENERGY RADIATING FROM THEM

RELATED APPLICATIONS

The present application is related to U.S. Provisional Patent Application, Ser. No. 60/638,956, filed on Dec. 23, 2004, which is incorporated herein by reference and to which priority is claimed pursuant to 35 USC 119.

BACKGROUND OF THE INVENTION

1. Field of the Invention

The invention relates the field of light sources using light emitting diodes (LEDs) and in particular to an apparatus and a method of collecting the energy radiating from them. The device could be used in general lighting, decorative and architectural lighting, portable and nonportable lighting, emergency lighting, fiber optic illumination and many other applications.

2. Description of the Prior Art

Typically in the prior art LED light source either a lens or a reflector is used to collect most of the 2π steradians front solid angle or forward hemispherical wavefront of light radiating from an LED. Recall that the solid angle Ω subtended by a surface S is defined as the surface area Ω of a unit sphere covered by the surface's projection onto the sphere. This can be written as:

$$\Omega \equiv \int\int_S \frac{\hat{n} \cdot da}{r^2}, \qquad (1)$$

where $\hat{n}$ is a unit vector from the origin, da is the differential area of a surface patch, and r is the distance from the origin to the patch. Written in spherical coordinates with $\phi$ the colatitude (polar angle) and $\theta$ for the longitude (azimuth), this becomes $$\Omega \equiv \int\int_S \sin\phi d\theta d\phi. \qquad (2)$$

A solid angle is measured in steradians, and the solid angle corresponding to all of space being subtended is 4π steradians.

Total internal reflection (TIR) is also used where the energy from the LED is collected both by an internal shaped reflector-like surface of a first lens and a second lens formed on either the outside or inside surface of the first lens.

Typically devices using a reflector alone generate a beam with two parts, one portion of the beam is reflected and controlled by the reflector and the other portion of the beam is direct radiation from the LED and is not controlled, i.e. not reflected or refracted by any other element. On a surface onto which this two-part beam is directed, the direct light appears as a large halo around the reflected beam. In the conventional LED package a ball lens is situated in front of a cylindrical rod, and the side emitted energy from the LED is substantially uncontrolled or radiated substantially as it is generated out of the emitter junction in the chip. In TIR systems, some portion of the energy radiated from the LED junction is leaked through the walls of the package and remains uncontrolled. Additionally, there are bulk and form losses as well. In systems with LEDs turned around to point back into a concave reflector, the center energy from the LED is shadowed by the LED package itself, so this energy is typically lost or not collected into a useful beam.

What is needed is some type of design whereby efficient collection of almost all of an LED's radiated energy can be obtained and projected into a directed beam with an illumination distribution needed to be useful.

BRIEF SUMMARY OF THE INVENTION

The illustrated embodiment of the invention is an apparatus comprising a light source radiating into a peripheral forward solid angle and a center forward solid angle. A reflector is positioned to reflect light from the light source from the peripheral forward solid angle into a longitudinal beam about an optical axis of the reflector. A lens is disposed longitudinally forward of the light source for focusing light into a predetermined beam pattern from the center forward solid angle into a skewed beam in a skewed direction with respect to the optical axis of the reflector to project a composite beam of light comprised of the light radiated in the skewed beam and the longitudinal beam.

Whereas the light source is described in the illustrated embodiment as an LED, it must be expressly understood that an incandescent or other light source can be substituted with full equivalency. Hence, wherever in the specification, "light source" is used, it must be understood to include an LED, incandescent, arc, fluorescent or plasma arc light or any equivalent light source now known or later devised, whether in the visible spectrum or not. Further, the light source may collectively comprise a plurality of such LEDs, incandescent, arc, fluorescent or plasma light sources or any other light sources now known or later devised organized in an array.

At least one of the reflector, lens and light source is relatively movable with respect to the others along the skewed direction to provide zoom focusing along the skewed direction. In the illustrated embodiment a motor, solenoid or some other kind of motorized means is used to move the reflector, lens and/or light source. In the illustrated embodiment the reflector, lens and light source are each independently movable from each other. In the preferred embodiment, the lens moves while the reflector and light source are held fixed relative to the light housing, mounting or some other point of reference. It is also contemplated that should the reflector and light source be the elements that are moved, that their motion may be coordinated with each other, but not necessarily identical in either the amount of movement or direction.

It is also contemplated within the scope of the invention that the lens comprises a plurality of lenses forming a lens assembly.

The apparatus may further comprise a plurality of light sources, reflectors and lenses combined to each provide a corresponding composite beam from an array of sources of composite beams, each having a corresponding skewed beam. The array of sources is characterized by composite longitudinal beam of the array and a selectively skewed pattern of light comprised of a composition of the skewed beams of the plurality of sources in the array.

It is to be understood that the apparatus may be in further combination with a flashlight, head torch, bike light, tactical flashlight, medical and dental head light, vehicular headlight, aircraft light, motorcycle light or any other type of lighting apparatus or system now known or later devised.

The invention further comprises a method comprising the steps of radiating light from a light source in a peripheral forward solid angle and in a center forward solid angle; reflecting light in the peripheral forward solid angle about an optical axis of a reflector; and selectively moving a lens relative to the light source to focus light from the center forward solid angle into a selected skewed beam in a skewed direction with respect to the optical axis of the reflector to project a composite beam of light comprised of the light radiated in the skewed beam and in the longitudinal beam.

The step of selectively moving the lens relative to the light source comprises the step of moving at least one of the reflector, lens and light source with respect to the others along the skewed direction to provide zoom focusing along the skewed direction.

Alternatively, the step of moving at least one of the reflector, lens and light source comprises moving the reflector, lens and light source each independently from each other.

The invention can still further be characterized as an apparatus comprising a light source radiating into a peripheral forward solid angle and a center forward solid angle. A reflector is positioned to reflect light from the light source from the peripheral forward solid angle into a longitudinal beam about an optical axis of the reflector. A lens is disposed longitudinally forward of the light source for focusing light into a predetermined beam pattern from the center forward solid angle into a skewed beam in a skewed direction with respect to the optical axis of the reflector to project a composite beam of light comprised of the light radiated in the skewed beam and the longitudinal beam. The reflector and lens collect almost all the light radiated by the light source and the longitudinal beam comprises all the light reflected from the reflector and the skewed beam comprises all the light directed by the lens.

By the pharse, "collection of almost all the light", it is meant to include all of the light radiated from the light source with reduction only for reflection inefficiencies due to physical imperfections in the shape of the lens or reflector or in inherent imperfections or losses in the reflective nature of the surface of the reflector or in the refractive quality of the lens, since it is understood that no lens is perfectly transparent or refractive to the light that is transmitted through it and no reflector is perfectly reflective of all of the light which falls onto it. The optical quality of lenses and reflectors varies according to well understood factors, such as the cost of materials of which they are made and the care by which they are manufactured.

The longitudinal and skewed beams include substantially all of the light radiated by the light source. At least one of the reflector, lens and light source is relatively movable with respect to the others along the skewed direction to provide zoom focusing along the skewed direction. In one embodiment the reflector, lens and light source are each independently movable from each other.

Stated in an alternative manner the illustrated embodiment is an apparatus comprising a light source where the light source comprises an LED emitter and a package in which the LED emitter is disposed, which LED emitter and package provide a Lambertian illumination pattern. The package has a protective dome. A reflector is positioned to reflect light from the light source from the peripheral forward solid angle into a longitudinal beam about an optical axis of the reflector. A lens is disposed longitudinally forward of the light source for focusing light into a predetermined beam pattern from the center forward solid angle into a skewed beam in a skewed direction with respect to the optical axis of the reflector to project a composite beam of light comprised of the light radiated in the skewed beam and the longitudinal beam. The reflector and lens collect almost all the light radiated by the light source and the longitudinal beam comprises all the light reflected from the reflector and the skewed beam comprises all the light directed by the lens. The longitudinal and skewed beams include substantially all of the light radiated by the light source.

The lens is disposed longitudinally forward of the protective dome and approximately collimates light radiated by the light source into the skewed beam, while the reflector approximately collimates light radiated by the light source into the longitudinal beam. In one embodiment the lens is disposed on or integrally made with the protective dome.

Still further, the illustrated embodiment can be characterized as an apparatus comprising a light source radiating into a peripheral forward solid angle and a center forward solid angle. A reflector is positioned to reflect light from the light source from the peripheral forward solid angle into a longitudinal beam about an optical axis of the reflector. A lens is disposed longitudinally forward of the light source for focusing light into a predetermined beam pattern from the center forward solid angle into a skewed beam in a skewed direction with respect to the optical axis of the reflector to project a composite beam of light comprised of the light radiated in the skewed beam and the longitudinal beam. The embodiment is characterized by (i) the reflector-and light source and (ii) the lens are each being independently movable from each other with the reflector and light source generally movable together.

The illustrated embodiment is also a method comprising the steps of radiating light from a light source; reflecting light into a longitudinal beam, which light is radiated from the light source into a peripheral forward solid angle; directing light into a skewed beam, which light is radiated from the light source into a central forward solid angle; and shifting energy from the longitudinal beam to the skewed beam or from the skewed beam to the longitudinal beam when focusing or defocusing, such that the direction of the light, which is always remaining in the first directed beam after shifting energy between the first and second directed beams, is unaffected.

The illustrated embodiment includes an apparatus for performing this method comprising a light source; a reflector for reflecting light into a longitudinal beam, which light is radiated from the light source into a peripheral forward solid angle; and a lens for directing light into a skewed beam, which light is radiated from the light source into a central forward solid angle, where no other optical element is positioned between the lens and the light source. The light source, reflector and lens are arranged and configured so that relative movement of the lens with respect to the reflector and the light source together, or of the reflector and the light source together with respect to the lens shifts energy from the longitudinal beam to the skewed beam or from the skewed beam to the longitudinal beam when zoom focusing or defocusing such that the direction of the light, which is always remaining in the longitudinal beam after shifting energy between the longitudinal and skewed beams, is unaffected.

Still further the illustrated embodiment can be defined as an apparatus comprising a light source; a reflector for reflecting light into a longitudinal beam, which light is radiated from the light source into a peripheral forward solid angle; a lens for directing light into a skewed beam, which light is radiated from the light source into a central forward solid angle; and means for shifting energy from the longitudinal beam to the skewed beam or from the skewed beam to the longitudinal beam when zoom focusing or defocusing such that the direction of the light, which is always remaining in the first directed beam after shifting energy between the first and second directed beams, is unaffected.

For purposes of the present disclosure, the term "LED" refers to any diode or combination of diodes that is capable of receiving an electrical signal and producing a color of light in response to the signal. Thus, the term "LED" as used herein should be understood to include light emitting diodes of all types (including semi-conductor and organic light emitting diodes), semiconductor dies that produce light in response to current, light emitting polymers, electro-luminescent strips, and the like. Furthermore, the term "LED" may refer to a single light emitting LED package having multiple semiconductor dies that are individually controlled. The term "LED" may refer to any type of non-packaged LEDs, surface mount LEDs, chip-on-board LEDs, and LEDs of all other configurations. The term "LED" also includes LEDs associated with other materials (e.g., phosphor, wherein the phosphor may convert radiant energy emitted from the LED to a different wavelength).

Additionally, as used herein, the term "light source" should be understood to include all illumination sources, including, but not limited to, LED-based sources as defined above, incandescent sources (e.g., filament lamps, halogen lamps), pyro-luminescent sources (e.g., flames), candle-luminescent sources (e.g., gas mantles), carbon arc radiation sources, photo-luminescent sources (e.g., gaseous discharge sources), fluorescent sources, phosphorescent sources, high-intensity discharge sources (e.g., sodium vapor, mercury vapor, and metal halide lamps), lasers, electro-luminescent sources, cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers capable of producing primary colors.

For purposes of the present disclosure, the term "light" should be understood to refer to the production of a frequency (or wavelength) of electromagnetic radiation by an illumination source (e.g., a light source). Furthermore, as used herein, the term "color" should be understood to refer to any frequency (or wavelength) of radiation within a spectrum; namely, "color" refers to frequencies (or wavelengths) not only in the visible spectrum, but also frequencies (or wavelengths) in the infrared, ultraviolet, and other areas of the electromagnetic spectrum. Similarly, for purposes of the present disclosure, the term "hue" refers to a color quality of radiation that is observed by an observer. In this sense, it should be appreciated that an observed hue of radiation may be the result of a combination of generated radiation having different wavelengths (i.e., colors), and may be affected by a medium through which the radiation passes before being observed (due to radiation absorption and/or scattering effects in the medium).

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 5*a* is a front plan view, FIG. 5*b* is a side cross-sectional view through lines A-A of FIG. 5*a,* and FIG. 5*c* is a side phantom view.

Figure 1:
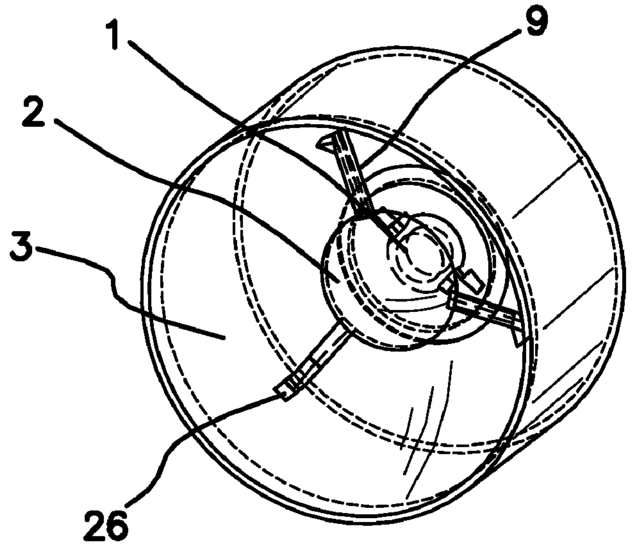
FIG. 1 is a perspective view of a first embodiment of the LED device of the invention.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

In FIGS. 1-4 a device incorporating the invention is generally denoted by reference numeral 24. LED source 1 is shown as packaged in a conventional package, which is comprised of a substrate in which the light emitting junction is defined encapsulated in a transparent epoxy or plastic housing formed to provide a front hemispherical front dome or lens(es) over the light emitting junction or chip. Many different types and shapes of packages could be employed by an LED manufacturer and all types and shapes are included within the scope of the invention. Hereinafter in the specification the term, "LED source 1" and in another embodiment as "LED source 18", shall be understood to include the passivating package in which the light emitting junction or chip is housed. Various means for thermal management of source 1 may also be included, which is shown as a thermally conductive connector base 17 in FIGS. 5*b* and 5*c,* which is thermally coupled to other heat sinks or finned bodies as is well known to the art.

Figure 2:
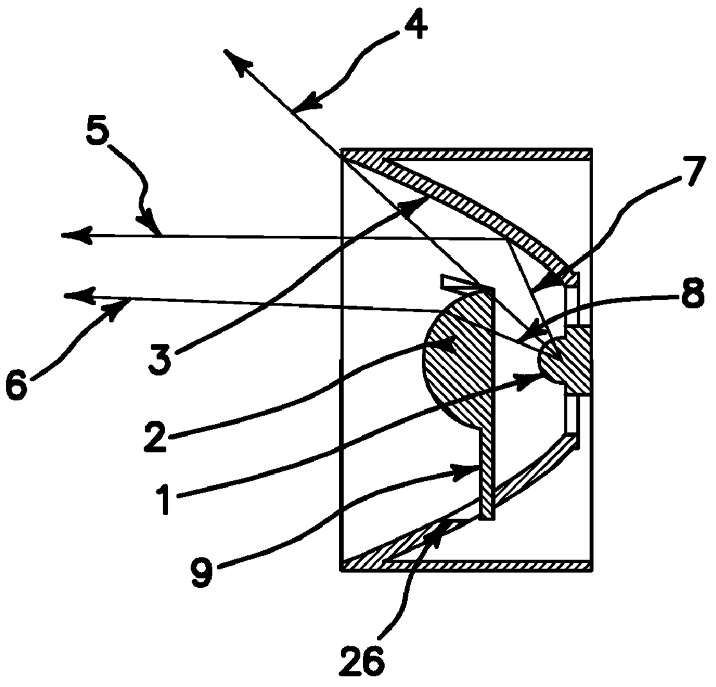
FIG. 2 is a side cross-sectional view of the embodiment of FIG. 1.

FIG. 1 shows a preferred embodiment of the invention in which a second lens 2 is suspended over an LED source 1 by arms 9 which are attached to notches 26 in the reflector 3. It must be expressly understood that lens 2 is meant to also include a plurality of lenses, such as a compound lens or an optical assembly of lenses. The surface 19 of reflector 3 may be specially treated or prepared to provide a highly specular or reflective surface for the wavelengths of light emitted by LED source 1. In the illustrated embodiment lens 2 is shown in FIGS. 1-4 as having a hemispherical front surface 20 and in the embodiment of FIGS. 1 and 2 a rear planar surface 22 or in the embodiment of FIGS. 3 and 4 a rear curved surface 23. Again, it is to be expressly understood that lens 2 need not be restricted to one having a hemispherical front surface 20, but may be replaced with a combination of multiple lenses of various configurations. Reflector 3 may include or be connected to an exterior housing 28, which provides support and connection to the apparatus (not shown) in which device 24 may be mounted. LED source 1 is disposed in the center of reflector 3 by housing 28 or other means (not shown) on the common optical axis of LED source 1, reflector 3 and lens 2. The lens 2 is suspended over the reflector 3 and the LED source 1 by means of spider 9 in such manner as to interfere as little as possible with the light radiating from or to the reflector 3. The embodiment of FIGS. 1 and 2 show a three legged spider 9, however, many other means may be employed as fully equivalent.

In FIG. 2, the LED source 1 is positioned substantially at the focus of a concave reflector 3 in such a manner as to collect essentially all the energy from the LED source 1 that is radiating into a region between about the forward π steradian solid angle (45 degrees half angle in side cross-sectional view) on the centerline or optical axis of the LED source 1 and about the forward 2.12 π steradian solid angle on the centerline or optical axis (95 degrees half angle in side cross-sectional view). The energy in this region, represented by ray 7 in the ray tracing diagram of FIG. 2, is reflected as illustrated by ray 5. The light directly radiating from the LED source 1 that is illustrated by a ray 4 at approximately 45 degrees off the on the centerline or optical axis will either be reflected by the reflector 3 or collected by lens 2, but will not continue outward as described by the line in FIG. 2 tracing ray 4.

The rays of light radiating from the LED source 1 that are contained within the angles of about 45 degrees and 0 degrees as illustrated by ray 8 will be collected by the lens 2 and controlled by the optical properties of lens 2 as illustrated in FIG. 2 by ray 6. The spider arms 9 may be as shown in FIGS. 1 and 2 or provided in many other configurations to suspend the lens 2 over the LED source 1. The only constraint on spider arms 9 is to support lens 2 in position on the optical axis at the desired longitudinal position consistent with the teachings of the invention while providing a minimum interference with the light propagation. Any configuration of spider arms 9 consistent with this object is contemplated as being within the contemplation of the invention.

Figure 7:
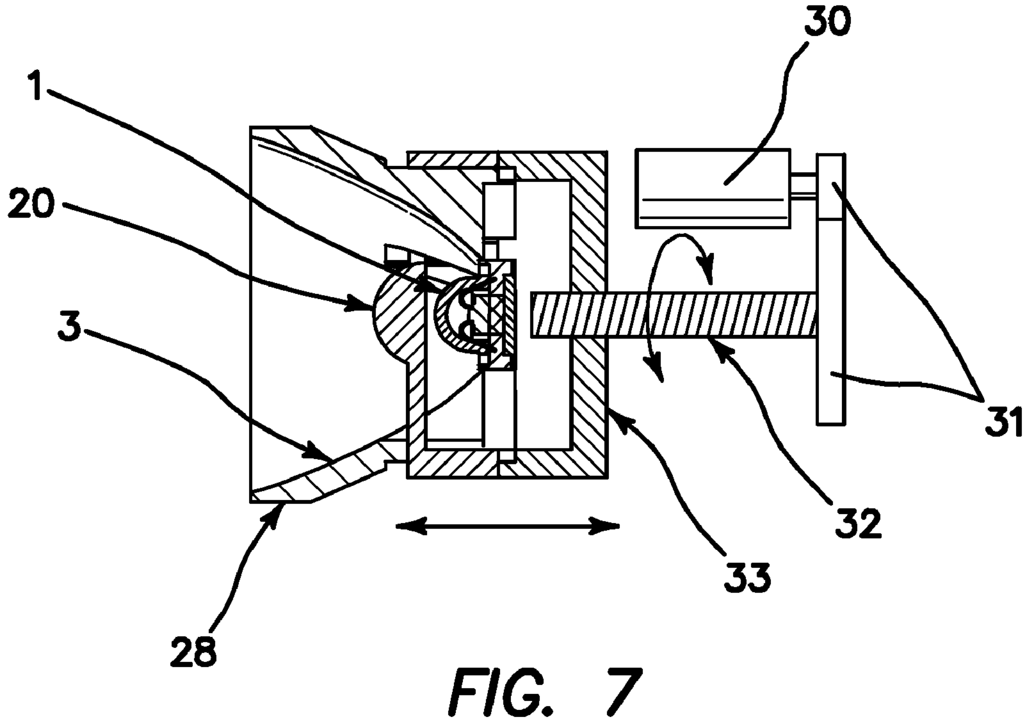
FIG. 7 is a side cross-sectional view of an embodiment of FIGS. 5 and 6 showing a motor and gear train for remote control or automatic zoom control.

It can thus be understood that the invention is adapted to a zoom or variable focus of the beam. For example, in the embodiment of FIG. 2, as better depicted in FIGS. 5*a*-5*c,* a motorized means 30, 31 is coupled to spider arms 9 and hence to lens 2 to move lens 2 longitudinally along the optical axis of reflector 3 to zoom or modify the divergence or convergence of the beam produced. FIG. 7 shows a motor 30 coupled to a gear train 31 to provide the motive force for zoom control. Means 30, 31 may assume any type of motive mechanism now known or later devised, and may, for example, comprise a plurality of inclined cams or ramps on a rotatable ring (not shown), which cams urge a spring loaded spider arms 9 forward along the longitudinal axis when rotated in one sense, and allow spring loaded spider arms 9 to be pulled back by a spring (not shown) along the longitudinal axis when the ring is rotated in the opposite sense. The ring can be manually rotated or preferably by an electric motor or solenoid, which is controlled by a switch (not shown) mounted on the flashlight body, permitting one-handed manipulation of the zoom focus with the same hand holding the flashlight. Manual or motorized zoom subject to manual control is illustrated, but it is also included within the scope of the invention that an optical or radiofrequency circuit may be coupled to motor 30 to provide for remote control.

The variability of zoom focus can be realized in the invention by relative movement of lens 2, reflector 3 and/or LED source 1 in any combination. Hence, the lens 2 and reflector 3 as a unit can be longitudinally displaced with respect to a fixed LED source 1 or vice versa, namely lens 2 and reflector 3 are fixed as a unit and LED source 1 is moved. Similarly, lens 2 can be longitudinally displaced with respect to fixed LED source 1 and reflector 3 as a unit as described above or vice versa, namely lens 2 is fixed as LED source 1 and reflector 3 are moved as a unit. Still further, it is within the scope of the invention that the movement of lens 2, reflector 3 and LED source 1 can each be made incrementally and independently from the other. The means for permitting such relative movements of these elements and for providing motive power for making the movement within the context of the invention is obtained by the application of conventional design principles.

Ray 5 is defined as that ray which is reflected from reflector 3 and just misses lens 2. In the wide angle beam in FIG. 5*b* ray 5 is shown in a first position which is assumed by ray 29 in the narrow beam configuration of FIG. 6. In FIG. 6, ray 5 moves radially outward. Hence, energy is taken from the reflected collimated narrow portion of the beam in FIG. 6 and put into the diverging refracted portion of the beam in the wide beam configuration of FIG. 5*b*. By this means the intensity of the wide angle beam is kept more uniform than would otherwise be the case, if energy shifting did not occur during the zoom transition from narrow to wide beam configurations between FIGS. 6 and 5*b* respectively.

Figure 3:
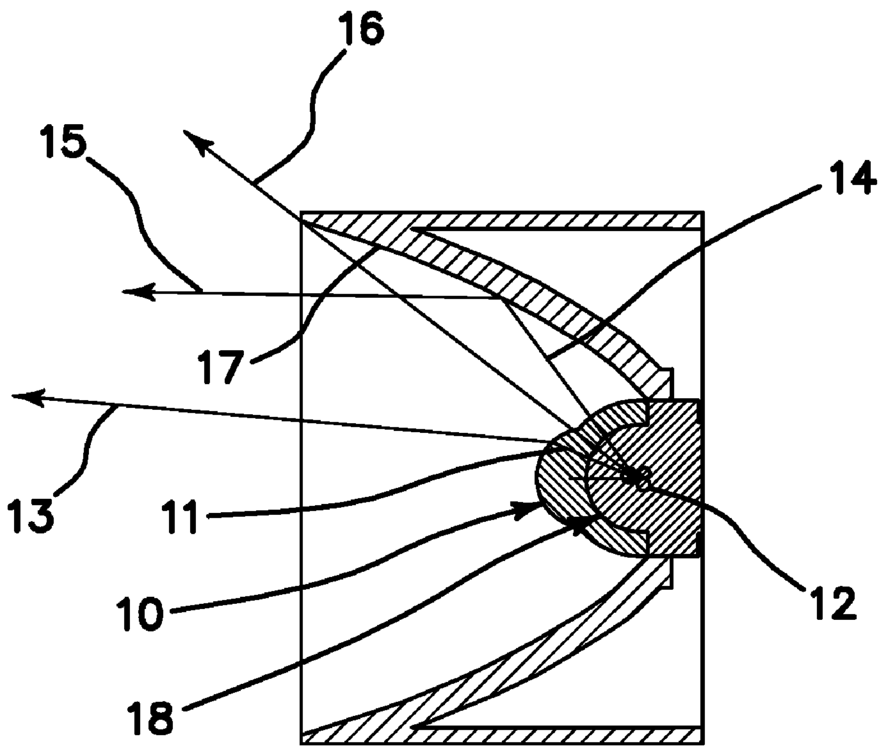
FIG. 3 is a side cross-sectional view of a second embodiment of the invention.
Figure 4:
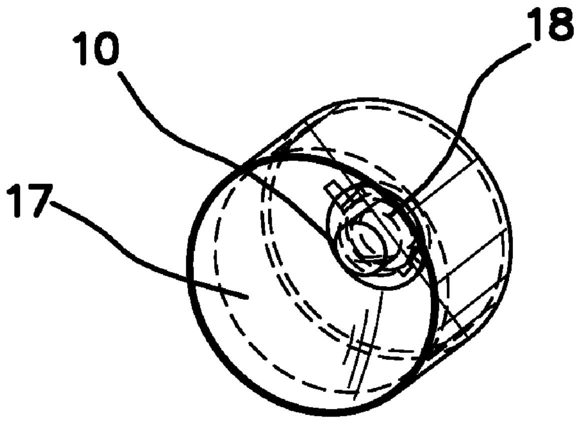
FIG. 4 is a perspective view of a second embodiment of FIG. 3.

FIG. 4 is a perspective view of an additional embodiment of the invention. The LED source 18 and second lens 10 are positioned within a concave reflector 17 best shown in the side cross-sectional view of FIG. 3. In the embodiment of FIG. 3 lens 10 is a separate component from LED source 18 itself. In the embodiment of FIG. 3 lens 10 is shown as having a rear surface 23 which conforms to the front surface of the packaging of LED source 18. The front surface of lens 10 has a compound curvature, namely a spherical peripheral or azimuthal ring which a surface 27 having a first radius of curvature, $r_1$, centered of approximately on emitter 12 and a central hemispherical surface portion 25 extending from surface 27 with a surface of a second smaller radius of curvature $r_2$, where $r_2<r_1$. The lens 10 could be incorporated instead as the lens of the packaging of LED source 18.

Essentially all the radiated light energy which is not absorbed by the LED chip from the LED emitter 12 are represented by rays 11, 16 or 14 in the ray diagram of FIG. 3. The light energy radiating from the LED emitter 12 that is represented by ray 16 is shown to be approximately 45 degrees off the central or optical axis of the LED source 18, i.e. within the front π steradian solid angle. Ray 14 represents rays that radiate outside the front π steradian solid angle demarcated by ray 16 to more than 90 degrees off the central or optical axis, namely to outside the front 2π steradian solid angle. The portion of lens 10 through which ray 14 passes is essentially spherical about the LED emitter 12 so that it does not affect or refract the direction of ray 14 to any significant extent. Ray 15 represents the rays that are reflected from the reflector 17. Ray 11 represents the rays that lie in the solid cone centered on an LED emitter 12 from the central optical axis of the LED source 18 to ray 16, i.e. the front π steradian solid angle. Ray 13 represents the rays that are refracted by surface 25 of lens 10. The portion 25 of lens 10 through which ray 13 passes refracts or alters the direction of ray 13. Ray 16 as shown in FIG. 3 and ray 4 as shown in FIG. 2 is shown as directly radiated from source 18 or 1 respectively, but in fact the geometry is selected such that rays 4 and 16 either are reflected as rays 5 and 15 respectively, or are refracted as rays 6 and 13 respectively.

The invention provides almost complete or 100% collection efficiency of the light energy radiated from an LED source 1 or 18 for purposes of illumination, and distribution of the collected energy into a controlled and definable beam pattern. Be reminded that an LED is a light emitting region mounted on the surface of a chip or substrate. Light from the radiating junction is primarily forward directed out of the surface of the chip with a very small amount directed to the sides and slightly below the substrate's horizon. Light radiating from the junction into the substrate is partially reflected, refracted and absorbed as heat. The invention collects substantially all the light, or energy radiated from an LED source 1 or 18 which is not absorbed in the substrate on or in which it sits and redirects it into two distinct beams of light as described below. By design, these beams could be aimed primarily into a single direction, but need not be where in an application a different distribution of the beams is desired.

The invention collects all of the LED energy in the two regions or beams. The first region is approximately the forward 2π steradian solid angle (45 degree half angle in a side cross-sectional view) and the second region is the energy that is radiated from the LED source 1 or 18 approximately between, for example, the forward 1.04 π steradian and 2.12 π steradian solid angles (47 degree half angle and 95 degree half angle in a side cross-sectional view respectively). The exact angular dividing line between the two beams can be varied according to the application at hand. The invention thus controls substantially all of the energy radiating from the LED source 1 or 18 with only surface, small figure losses and a small loss due to the suspension means spider arms 9 for the hemispherical ball lens 2. Figure losses include light loss due to imperfections in some aspect of the optical system arising from the fact that seams, edges, fillets and other mechanical disruptions in the light paths are not perfectly defined with mathematical sharpness, but are made from three-dimensional material objects having microscopic roughness or physical tolerances of the order of a wavelength or greater. Losses due to the edges of the Fresnel lens not being infinitely sharp or at least having a lack of sharpness at least in part at a scale of more than a wavelength of light is an example of such figure losses.

In the embodiment of FIGS. 1 and 2 for example, the energy in the first region is collected via lens 2 that is suspended over the LED 1. The energy in the second region is collected via a reflector 3. The slight overlap in collection angle is to insure no energy from the emitter is leaked between the two regions due to the LED emitter being larger than a point source. The resultant beam can be designed to match system requirements by altering either or both of the primary elements, the lens 2 or the reflector 3. The invention allows for either of these surfaces 20 and 22 to be modified to control the resultant beam.

The reflector 3 may be designed to provide a collimated, convergent or divergent beam. The reflector 3 may be a common conic or not and may be faceted, dimpled or otherwise modified to provide a desired beam pattern. The device 24 may optionally have at least one additional lens and/or surface(s) formed as part of the LED packaging that further control or modify the light radiating from the reflector 3 and lens 2.

Thus, it can now be understood that the optical design of lens 2 and 10 including its longitudinal positioning relative to emitter 12 can be changed according to the teachings of the invention to obtain the objectives of the invention. For example, the nature of the illumination in the central solid angle of the two-part beam can be manipulated by the optical design of lens 2 and 10, e.g. the degree of collimation. Further, the dividing line and transition between the two parts of the beam, namely the central and peripheral solid angles of the beam, can be manipulated by the longitudinal positioning and radial size or extent of lens 2 and 10 relative to emitter 12.

Figure 8:
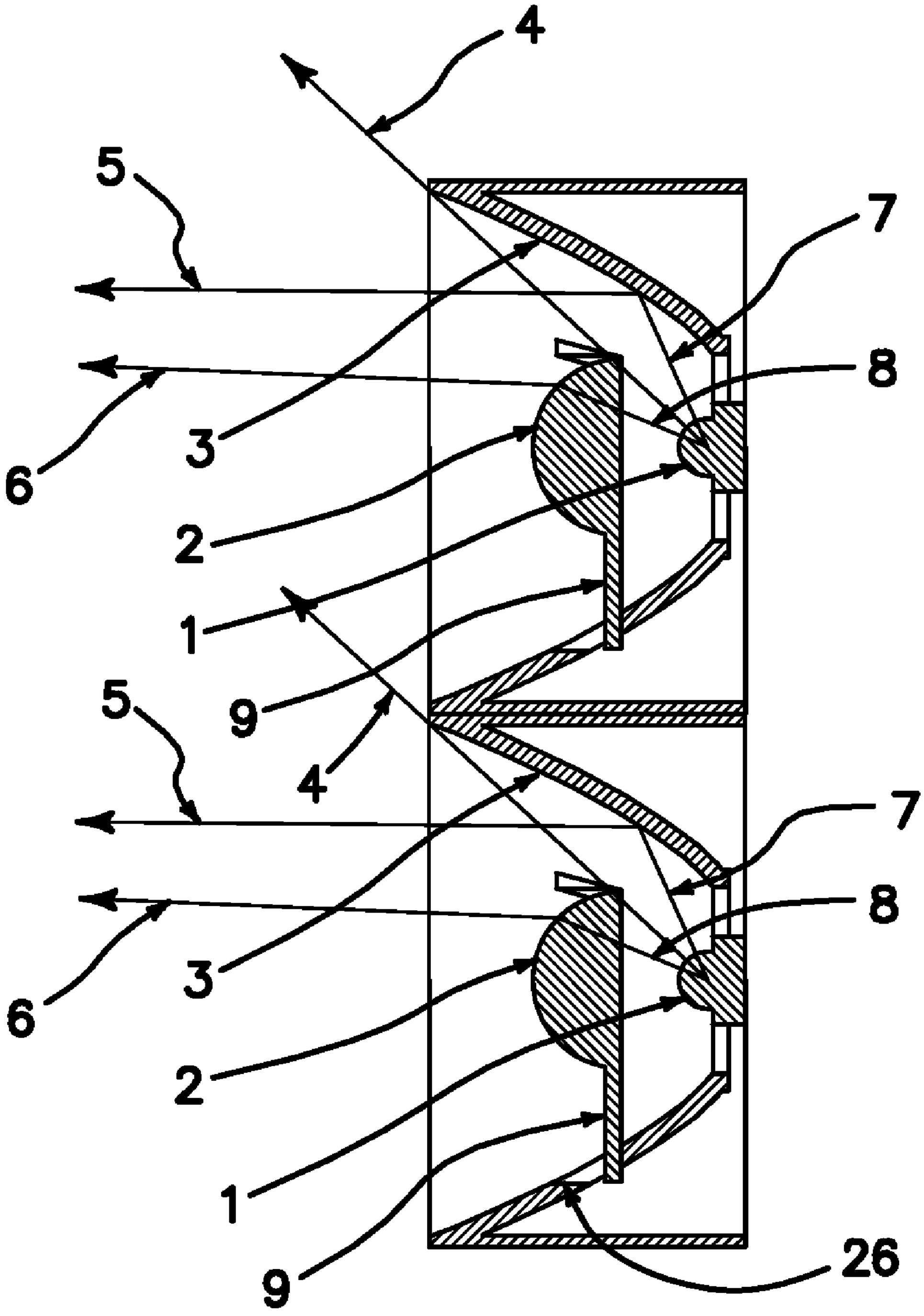
FIG. 8 is a side cross-sectional view where a plurality of embodiments of the type shown in FIG. 5 are combined into an array.

Multiple numbers of devices 24 may be arrayed to provide additional functionality as shown diagrammatically in FIG. 8. These arrays could include two or more instances of the invention that may be individually optimized by having a unique set of lenses 2 and reflectors 3. For example, an array of devices described above could be used to provide more light than a single cell or unit. The various light sources according to the invention in such an array could be pointed in selected directions, which vary according to design for each element depending on the lighting application at hand. The elements may each have a different focus or beam pattern, or may comprise at least more than one class of elements having a different focus or beam pattern for each class. For example, the invention when used in a street light may be designed in an array to have a broadly spread beam directly under the lamp array, and a closer or more specifically focused spot or ring sending light out to the peripheral edges of the illumination pattern.

Many alterations and modifications may be made by those having ordinary skill in the art without departing from the spirit and scope of the invention. For example, while the illustrated embodiment of the invention has been described in the context of a portable flashlight, it must be understood that the potential range of application is broader and specifically includes, but is not limited to, head torches, bike lights, tactical flashlights, medical head lights, automotive headlights or taillights, motorcycles, aircraft lighting, marine applications both surface and submarine, nonportable lights and any other application where an LED light source might be desired.

Still further the invention when implemented as a flashlight may have a plurality of switching and focusing options or combinations. For example, a tail cap switch may be combined with a focusing or zoom means that is manually manipulated by twisting a flashlight head or other part. The tail cap switch could be realized as a twist on-off switch, a slide switch, a rocker switch, or a push-button switch and combined with an electronic switch for focusing. The nature, form and position of the switch and its activated control may assume any form now known or later devised and be combined with a focusing means which is manual, motorized, automated and may also take any form now known or later devised.

Figure 5A:
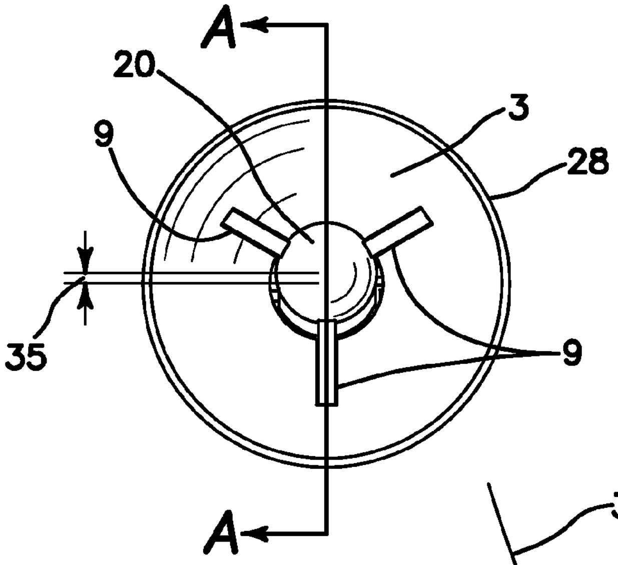
FIGS. 5*a*-5*c* are views of an embodiment of the invention where zoom control by relative movement of various elements in the device is provided and a wide angle beam is formed.
Figure 5B:
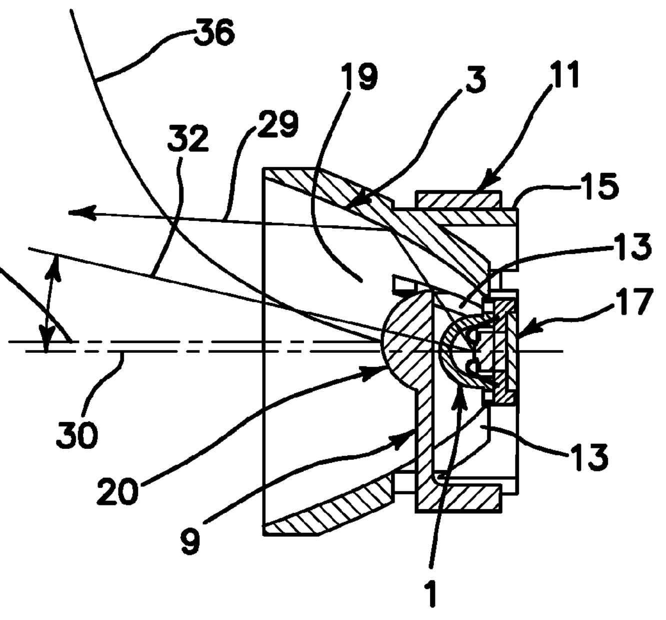
Figure 5C:
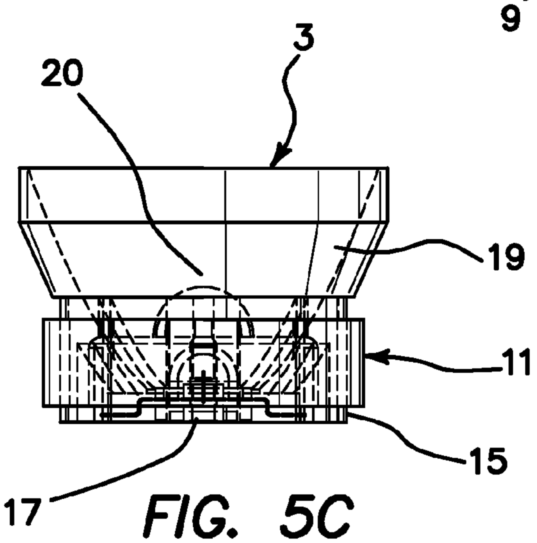
Figure 6:
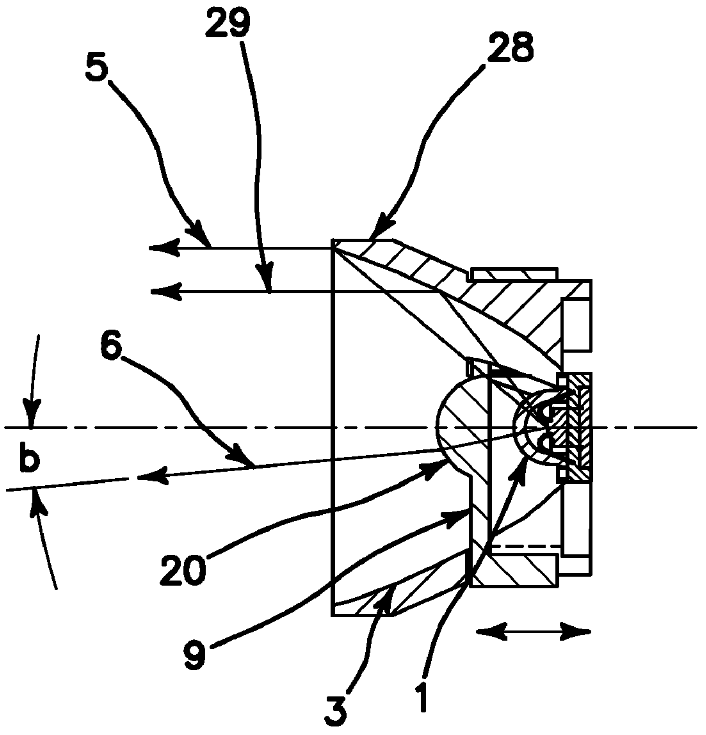
FIG. 6 is a side cross-sectional view of the embodiment of FIG. 5 where a narrow angle beam is formed.

Lens 2 is disclosed in FIGS. 5 and 6 as being translatable on the longitudinal axis 30 shown in dotted line of the light source. It is contemplated that lens 2 may be translatable on a line other than axis of symmetry 30. For example as best shown in FIG. 5*b*, lens 2 may be translated along an axis 34 which is parallel to axis 30 and offset by a predetermined distance 35 as best shown in FIG. 5*a;* along a skewed line 32 which intersects axis 30 at a selected point; and/or along a curvilinear line 36 of arbitrarily selected shape as shown in FIG. 5*b*. The line of translation of lens 2, including possible rotation of lens 2 about a coordinate frame centered on lens 2, namely a tilting of lens 2, is determined according to the asymmetry of the light pattern desired in each application. In a nontilted offset position lens 2 will project the central direct beam as a similar image to the shape of the LED emitter chip with rounding. Since the emitter chip is typical square, the off center projected beam from off center lens 2 will appear as a squircle, which is a rounded square or a squared circle according to degrees.

For example, in the application of a vehicle or bicycle light, it has been determined that an asymmetric pattern can be provided according to the invention, which pattern has a bright central beam along or nearly along axis 30 with an asymmetric field of illumination that can be directed down to the roadway surface by the central beam from lens 2.

In addition to be translatable along an off-axis line 34, lens 2 may have the angle of orientation of its optical axis changed from being parallel to axis 30 to some other direction, such as being parallel to line 32 or a tangent to curve 36 at the point where lens 2 may be positioned.

The means of moving lens 2 is conventional and includes any and all mechanical and electromechanical motion systems now known or later devised. For example, a rigid wire lying in the desired direction or curve of axes 32-36 may be engaged or coupled with lens 2 so it carries or guides lens 2 along the path of the wire, such as a wire disposed through a hole defined through lens 2. Lens 2 could then be pulled or pushed along the wire by an actuator. Alternatively, lens 2 may be mounted on a support coupled to a mechanical or electromechanical actuator, which support extends into the reflection or optical space defined by reflector 28 and has its direction and extension controlled distally outside the space by a cam and slot combination. These examples by no means exhaust the means by which lens 2 may be moved and its motion controlled and be deemed equivalent to the disclosed invention. In the same manner similar conventional mechanisms can be employed to move reflector 3 and light source 1 in a direction or along a curve either independently or in a coupled manner.

One possible embodiment for the means for moving lens 2 is shown in FIGS. 5*a*-5*c* where the lens remains unrotated. Lens 2 is held by suspension means or spider arms 9 which is comprises of three equally spaced spider arms 9 extending through corresponding slots 13 defined in reflector 3 and coupled to a translatable collar 11. Collar 11 is slidable on a cylindrical rear extending portion 15 of reflector 3 and is actuated by a conventional motor, solenoid or other actuator (not shown).

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus comprising:

a light source radiating into a peripheral forward solid angle and a center forward solid angle;

a reflector positioned to reflect light from the light source from the peripheral forward solid angle into a longitudinal beam about an optical axis of the reflector; and a lens disposed longitudinally forward of the light source for focusing light into a predetermined beam pattern from the center forward solid angle into a skewed beam in a skewed direction with respect to the optical axis of the reflector to project a composite beam of light comprised of the light radiated in the skewed beam and the longitudinal beam.

2. The apparatus of claim 1 where at least one of the reflector, lens and light source is relatively movable with respect to the others along the skewed direction to provide zoom focusing along the skewed direction.

3. The apparatus of claim 2 further comprising motorized means and where at least one of the reflector, lens and light source are movable by the motorized means.

4. The apparatus of claim 1 where the reflector, lens and light source are each independently movable from each other.

5. The apparatus of claim 1 where the lens comprises a plurality of lenses forming a lens assembly.

6. The apparatus of claim 1 further comprising a plurality of light sources, reflectors and lenses combined to each provide a corresponding composite beam from an array of sources of composite beams, each having a corresponding skewed beam.

7. The apparatus of claim 6 where the array of sources is characterized by composite longitudinal beam of the array and a selectively skewed pattern of light comprised of a composition of the skewed beams of the plurality of sources in the array.

8. The apparatus of claim 6 in further combination with a flashlight, head torch, bike light, tactical flashlight, medical and dental head light, vehicular headlight, aircraft light or motorcycle light.

9. The apparatus of claim 1 in further combination with a flashlight, head torch, bike light, tactical flashlight, medical and dental head light, vehicular headlight, aircraft light or motorcycle light.

10. An apparatus comprising:

a light source radiating into a peripheral forward solid angle and a center forward solid angle;

a reflector positioned to reflect light from the light source from the peripheral forward solid angle into a longitudinal beam about an optical axis of the reflector; and a lens disposed longitudinally forward of the light source for zoom focusing light into a predetermined beam pattern from the center forward solid angle into a skewed beam in a skewed direction with respect to the optical axis of the reflector to project a composite beam of light comprised of the light radiated in the skewed beam and the longitudinal beam, where the reflector and lens collect almost all the light radiated by the light source and the longitudinal beam comprises all the light reflected from the reflector and the skewed beam comprises all the light directed by the lens and where the longitudinal and skewed beams include substantially all of the light radiated by the light source.

11. The apparatus of claim 10 where at least one of the reflector, lens and light source is relatively movable with respect to the others along the skewed direction to provide zoom focusing along the skewed direction.

12. The apparatus of claim 10 where the reflector, lens and light source are each independently movable from each other.

13. An apparatus comprising:

a light source where the light source comprises an LED emitter and a package in which the LED emitter is disposed, which LED emitter and package provide a Lambertian illumination pattern, the package having a protective dome;

a reflector positioned to reflect light from the light source from the peripheral forward solid angle into a longitudinal beam about an optical axis of the reflector; and a lens disposed longitudinally forward of the light source for zoom focusing light into a predetermined beam pattern from the center forward solid angle into a skewed beam in a skewed direction with respect to the optical axis of the reflector to project a composite beam of light comprised of the light radiated in the skewed beam and the longitudinal beam where the reflector and lens collect almost all the light radiated by the light source and the longitudinal beam comprises all the light reflected from the reflector and the skewed beam comprises all the light directed by the lens, where the longitudinal and skewed beams include substantially all of the light radiated by the light source.

14. The apparatus of claim 13 where lens is disposed longitudinally forward of the protective dome.

15. The apparatus of claim 13 where the lens approximately collimates light radiated by the light source into the skewed beam.

16. The apparatus of claim 13 where the reflector approximately collimates light radiated by the light source into the longitudinal beam.

17. The apparatus of claim 13 where the lens to direct light into the skewed beam is disposed on or integrally made with the protective dome.

18. An apparatus comprising:

a light source radiating into a peripheral forward solid angle and a center forward solid angle;

a reflector positioned to reflect light from the light source from the peripheral forward solid angle into a longitudinal beam about an optical axis of the reflector; and a lens disposed longitudinally forward of the light source for zoom focusing light into a predetermined beam pattern from the center forward solid angle into a skewed beam in a skewed direction with respect to the optical axis of the reflector to project a composite beam of light comprised of the light radiated in the skewed beam and the longitudinal beam, where (i) the reflector-and light source and (ii) the lens are each independently movable from each other with the reflector and light source generally movable together.

19. An apparatus comprising:

a light source;

a reflector for reflecting light into a longitudinal beam, which light is radiated from the light source into a peripheral forward solid angle; and a lens for directing light into a skewed beam, which light is radiated from the light source into a central forward solid angle, where no other optical element is positioned between the lens and the light source and where the light source, reflector and lens are arranged and configured so that relative movement of the lens with respect to the reflector and the light source together, or of the reflector and the light source together with respect to the lens shifts energy from the longitudinal beam to the skewed beam or from the skewed beam to the longitudinal beam when zoom focusing or defocusing such that the direction of the light, which is always remaining in the longitudinal beam after shifting energy between the longitudinal and skewed beams, is unaffected.

20. An apparatus comprising:

a light source;

a reflector for reflecting light into a longitudinal beam, which light is radiated from the light source into a peripheral forward solid angle;

a lens for directing light into a skewed beam, which light is radiated from the light source into a central forward solid angle; and means for shifting energy from the longitudinal beam to the skewed beam or from the skewed beam to the longitudinal beam when zoom focusing or defocusing such that the direction of the light, which is always remaining in the longitudinal beam after shifting energy between the longitudinal and skewed beams, is unaffected.

* * * * *